（12) United States Patent
Takenouchi et al.

(10) Patent No.: US 11,594,732 B2
(45) Date of Patent: Feb. 28, 2023

(54) ORGANO SULFUR-BASED ELECTRODE ACTIVE MATERIAL (71) Applicant: ADEKA CORPORATION, Tokyo (JP)

(72) Inventors: Hiromi Takenouchi, Tokyo (JP); Tomofumi Yokomizo, Tokyo (JP); Hirokatsu Shinano, Tokyo (JP); Kenji Kakiage, Tokyo (JP); Yuta Nohara, Tokyo (JP); Yohei Aoyama, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 469 days.

(21) Appl. No.: 16/960,782

(22) PCT Filed: Feb. 25, 2019

(86) PCT No.: PCT/JP2019/007034
§ 371 (c)(1),
(2) Date: Jul. 8, 2020

(87) PCT Pub. No.: WO2019/167875
PCT Pub. Date: Sep. 6, 2019

(65) Prior Publication Data
US 2020/0350587 A1 Nov. 5, 2020

(30) Foreign Application Priority Data
Mar. 1, 2018 (JP) ............... JP2018-036246

(51) Int. Cl.
*H01M 4/60* (2006.01)
*C08F 8/36* (2006.01)
*C08K 3/08* (2006.01)

(52) U.S. Cl.
CPC ............... *H01M 4/608* (2013.01); *C08F 8/36* (2013.01); *C08K 3/08* (2013.01);
(Continued)

(58) Field of Classification Search
CPC ........... H01M 4/608; H01M 2004/027; H01M 2004/028; H01M 4/137; H01M 4/1399;
(Continued)

(56) References Cited

U.S. PATENT DOCUMENTS 3,328,332 A * 6/1967 Dannelly .................. C08F 2/36
524/742
4,739,018 A 4/1988 Armand et al.
(Continued)

FOREIGN PATENT DOCUMENTS

CN 101421445 A 4/2009
CN 102160217 A 8/2011
(Continued)

OTHER PUBLICATIONS

International Search Report, dated Apr. 9, 2019, from corresponding PCT application No. PCT/JP2019/007034.
(Continued)

*Primary Examiner* — Andrew J. Oyer
(74) *Attorney, Agent, or Firm* — Nixon & Vanderhye (57) ABSTRACT

Disclosed is an electrode active material that has a large charge discharge capacity, a high initial efficiency, as well as excellent cycle characteristics and rate characteristics and is favorably used in a non-aqueous electrolyte secondary battery. An organo sulfur-based electrode active material contains sodium and potassium in a total amount of 100 ppm by mass to 1000 ppm by mass; an electrode for use in a secondary battery, the electrode containing the organo sulfur-based electrode active material as an electrode active material; and a non-aqueous electrolyte secondary battery including the electrode. Preferably, the organo sulfur-based electrode active material further contains iron in an amount of 1 ppm by mass to 20 ppm by mass. Preferably, the organo sulfur-based electrode active material is sulfur-modified (Continued)

polyacrylonitrile, and the amount of sulfur in the organo sulfur-based electrode active material is 25 mass % to 60 mass %.

19 Claims, 2 Drawing Sheets

(52) U.S. Cl.
CPC ............ *C08K 2003/0825* (2013.01); *C08K 2003/0856* (2013.01); *C08K 2201/001* (2013.01)

(58) Field of Classification Search
CPC ......... H01M 4/606; H01M 4/62; H01M 4/60; H01M 10/052; C08F 8/36; C08F 120/44; C08F 8/34; C08K 3/08; C08K 2003/0825; C08K 2003/0856; C08K 2201/001; Y02E 60/10
See application file for complete search history.

(56) References Cited

U.S. PATENT DOCUMENTS

| | | | |
|---|---|---|---|
| 6,420,072 | B1 | 7/2002 | Maruyama et al. |
| 8,940,436 | B2 | 1/2015 | Miyuki et al. |
| 10,008,722 | B2 | 6/2018 | Hochi et al. |
| 2001/0047060 | A1 | 11/2001 | Michels et al. |
| 2008/0096132 | A1 | 4/2008 | Araki et al. |
| 2009/0053953 | A1 | 2/2009 | Mion et al. |
| 2011/0200875 | A1* | 8/2011 | Miyuki ............... C08F 8/34 429/213 |
| 2014/0134485 | A1 | 5/2014 | Miyuki et al. |
| 2017/0283524 | A1 | 10/2017 | Wang et al. |
| 2018/0065927 | A1 | 3/2018 | Senoh et al. |
| 2018/0072665 | A1 | 3/2018 | Takeuchi et al. |

FOREIGN PATENT DOCUMENTS

| | | |
|---|---|---|
| CN | 107709233 A | 2/2018 |
| EP | 0157818 A1 | 10/1985 |
| EP | 1054465 A1 | 11/2000 |
| EP | 1148069 A1 | 10/2001 |
| EP | 1905787 A2 | 4/2008 |
| EP | 1991722 A1 | 11/2008 |
| EP | 2337126 A1 | 6/2011 |
| EP | 3279141 A1 | 2/2018 |
| JP | S60-502213 A | 12/1985 |
| JP | S61-258810 A | 11/1986 |
| JP | 2000-331533 A | 11/2000 |
| JP | 2001-302720 A | 10/2001 |
| JP | 2008-106246 A | 5/2008 |
| JP | 2009-528453 A | 8/2009 |
| JP | 2011-028948 A | 2/2011 |
| JP | 2011-170991 A | 9/2011 |
| JP | 2012-099342 A | 5/2012 |
| JP | 2012-150933 A | 8/2012 |
| JP | 2012-150934 A | 8/2012 |
| JP | 2014-096326 A | 5/2014 |
| JP | 2014-096327 A | 5/2014 |
| JP | 2015-227438 A | 12/2015 |
| KR | 20010029730 A | 4/2001 |
| KR | 20080096814 A | 11/2008 |
| KR | 20110070868 A | 6/2011 |
| KR | 20170133406 A | 12/2017 |
| WO | 85/01293 A1 | 3/1985 |
| WO | 2007/098796 A1 | 9/2007 |
| WO | 2010044437 A1 | 3/2012 |
| WO | 2012/132173 A | 10/2012 |
| WO | 2012/114651 A1 | 7/2014 |
| WO | 2016/159212 A1 | 12/2017 |

OTHER PUBLICATIONS

Polyacrylonitrile from a Slurry Polymerization; Macromolecular Syntheses; 1977; Collective vol. 1; pp. 167-169.

* cited by examiner

ORGANO SULFUR-BASED ELECTRODE ACTIVE MATERIAL

TECHNICAL FIELD

The present invention relates to an organo sulfur-based electrode active material that can be favorably used as an electrode active material in a non-aqueous electrolyte secondary battery.

BACKGROUND ART

Non-aqueous electrolyte secondary batteries such as lithium ion secondary batteries are small and lightweight, have a high energy density, are furthermore can be repeatedly charged and discharged, and thus are widely used as power sources for portable electronic devices such as portable personal computers, handheld video cameras, and information terminals. Also, from the viewpoint of environmental issues, electric vehicles, in which non-aqueous electrolyte secondary batteries are used, and hybrid vehicles, in which electric power is used as part of the motive power, are in practical use. Therefore, in recent years, there has been demand for further improvements in performance of secondary batteries.

The characteristics of a non-aqueous electrolyte secondary battery depend on constituent members such as electrodes, a separator, and an electrolyte, and research and development on the various constituent members have been actively conducted. In an electrode, an electrode active material is important as well as a binding agent, a current collecting material, and the like, and thus, research and development on electrode active materials have been actively conducted.

An organo sulfur-based electrode active material that is obtained by heat-treating a mixture of an organic compound and sulfur in a non-oxidizing atmosphere is known as an electrode active material that has a large charge discharge capacity and in which the reduction in the charge discharge capacity caused by repetition of charge and discharge (hereinafter, also referred to as "cycle characteristics") is small (see Patent Literatures 1 to 12, for example). Organo sulfur-based electrode active materials have been studied mainly as electrode active materials for a positive electrode, but also have been studied as electrode active materials for a negative electrode (see Patent Literatures 8 and 9, for example).

CITATION LIST

Patent Literature

Patent Literature 1: U.S. Pat. No. 8,940,436
Patent Literature 2: JP 2011-028948A
Patent Literature 3: JP 2011-170991A
Patent Literature 4: JP 2012-099342A
Patent Literature 5: JP 2012-150933A
Patent Literature 6: JP 2012-150934A
Patent Literature 7: WO 2012/114651
Patent Literature 8: US 2014134485
Patent Literature 9: JP 2014-096327A
Patent Literature 10: U.S. Pat. No. 10,008,722
Patent Literature 11: US 2018072665
Patent Literature 12: US 2018065927

SUMMARY OF INVENTION

There is demand for further improvements in battery characteristics of non-aqueous electrolyte secondary batteries, and accordingly, electrode active materials having better performance are also in demand. An object of the present invention is to provide an electrode active material that has a large charge discharge capacity, a high initial efficiency, as well as excellent cycle characteristics and rate characteristics and is favorably used in a non-aqueous electrolyte secondary battery.

The inventors of the present invention conducted an in-depth study and found that, if the total amount of sodium and potassium in an organo sulfur-based electrode active material is within a specific range, an electrode having a high initial efficiency and excellent rate characteristics can be obtained. Thus, the present invention was accomplished. That is to say, the present invention provides an organo sulfur-based electrode active material containing sodium and potassium in a total amount of 100 ppm by mass to 1000 ppm by mass.

DESCRIPTION OF EMBODIMENTS

In the present invention, an organo sulfur-based electrode active material refers to a compound that has a sulfur-carbon bond, is capable of occluding and releasing lithium ions, and can be used as an electrode active material of a secondary battery. The organo sulfur-based electrode active material is a compound obtained by heat-treating a mixture of an organic compound and sulfur in a non-oxidizing atmosphere, and examples thereof include sulfur-modified polyacrylonitrile, a sulfur-modified elastomer compound, a sulfur-modified polynuclear aromatic ring compound, a sulfur-modified pitch compound, a polythienoacene compound, a sulfur-modified polyether compound, a sulfur-modified polyamide compound, a sulfur-modified aliphatic hydrocarbon oxide, and the like. In the present invention, an organic compound that is used as the raw material for an organo sulfur-based electrode active material may be referred to as a raw material organic compound.

The sulfur-modified polyacrylonitrile is a compound obtained by heating polyacrylonitrile and elemental sulfur in a non-oxidizing atmosphere. The polyacrylonitrile may be a homopolymer of acrylonitrile, or may be a copolymer of acrylonitrile and another monomer. If the polyacrylonitrile is a copolymer, the amount of acrylonitrile in the copolymer is preferably at least 90% by mass or more because the battery performance decreases as the amount of acrylonitrile is lower. Examples of the other monomer include acrylic acid, vinyl acetate, N-vinylformamide, and N,N'-methylenebis(acrylamide).

The proportion of elemental sulfur to polyacrylonitrile in the heating processing is preferably 100 parts by mass to 1500 parts by mass, and more preferably 150 parts by mass to 1000 parts by mass, relative to 100 parts by mass of polyacrylonitrile. The heating temperature is preferably 250° C. to 550° C., and more preferably 350° C. to 450° C.

Unreacted elemental sulfur causes a reduction in the cycle characteristics of the secondary battery, and it is therefore preferable to remove unreacted elemental sulfur by performing, for example, heating, solvent washing, or the like after the heating processing. The amount of sulfur in sulfur-modified polyacrylonitrile is preferably 25 to 60 mass %, and more preferably 30 to 55 mass %, because a large charge discharge capacity can be obtained.

The sulfur-modified elastomer compound is a compound obtained by heating rubber and elemental sulfur in a non-oxidizing atmosphere. Examples of the rubber include natural rubber, isoprene rubber, butadiene rubber, styrene-butadiene rubber, acrylonitrile-butadiene rubber, and the like. These types of rubber can be used alone or in a combination of two or more. The raw material rubber may be vulcanized or unvulcanized.

The proportion of elemental sulfur to rubber in the heating processing is preferably 100 parts by mass to 1500 parts by mass, and more preferably 150 parts by mass to 1000 parts by mass, relative to 100 parts by mass of rubber. When performing the heating processing, one or more known vulcanization accelerators may be added. The amount of vulcanization accelerator that is added is preferably 1 part by mass to 250 parts by mass, and more preferably 5 parts by mass to 50 parts by mass, relative to 100 parts by mass of rubber. The heating temperature is preferably 250° C. to 550° C., and more preferably 300° C. to 450° C. Unreacted elemental sulfur causes a reduction in the cycle characteristics of the secondary battery, and it is therefore preferable to remove unreacted elemental sulfur from the sulfur-modified elastomer compound by performing, for example, heating, solvent washing, or the like. The amount of sulfur in the sulfur-modified elastomer compound is preferably 40 to 70 mass %, and more preferably 45 to 60 mass %, because a large charge discharge capacity can be obtained.

The sulfur-modified polynuclear aromatic ring compound is a compound obtained by heating a polynuclear aromatic ring compound and elemental sulfur in a non-oxidizing atmosphere. Examples of the polynuclear aromatic ring compound include benzene aromatic ring compounds, such as naphthalene, anthracene, tetracene, pentacene, phenanthrene, chrysene, picene, pyrene, benzopyrene, perylene, and coronene. Other examples include aromatic ring compounds in which part of the rings of benzene aromatic ring compounds are five-membered, or heteroatom-containing heteroaromatic ring compounds in which part of the carbon atoms of these aromatic ring compounds are replaced by sulfur, oxygen, nitrogen, or the like. Furthermore, these polynuclear aromatic ring compounds may have a substituent, such as a chain or branched alkyl group having 1 to 12 carbon atoms, an alkoxyl group, a hydroxyl group, a carboxyl group, an amino group, an aminocarbonyl group, an aminothio group, a mercapto-thiocarbonylamino group, and a carboxyalkylcarbonyl group.

The polynuclear aromatic ring compound may be a compound that has a structure in which an aromatic moiety and a chain hydrocarbon moiety are repeated. Examples of the aromatic moiety of the compound that has a structure in which an aromatic moiety and a chain hydrocarbon moiety are repeated include, in addition to the above-described compounds, benzene, pyrrolidine, pyrrole, pyridine, imidazole, pyrrolidone, tetrahydrofuran, triazine, thiophene, oxazole, thiazole, thiadiazole, triazole, phosphole, silole, and the like, and two or more aromatic rings may be condensed, and these aromatic moieties may be condensed with cyclopentane, cyclohexane, pyrrolidine, tetrahydrofuran, or the like. Moreover, these aromatic moieties may have a substituent, such as a chain or branched alkyl group having 1 to 12 carbon atoms, an alkoxyl group, a hydroxyl group, a carboxyl group, an amino group, an aminocarbonyl group, an aminothio group, a mercapto-thiocarbonylamino group, a carboxyalkylcarbonyl group, or the like.

Examples of the chain hydrocarbon moiety of the compound that has a structure in which an aromatic moiety and a chain hydrocarbon moiety are repeated include linear or branched chain hydrocarbons, such as an alkylene group, an alkenylene group, and an alkynylene group. The chain hydrocarbon moiety has preferably 2 to 20 carbon atoms, more preferably 3 to 10 carbon atoms, and even more preferably 4 to 8 carbon atoms. From the viewpoint of the ease of handling and the price, the chain hydrocarbon moiety is preferably an alkylene group or an alkenylene group, and particularly preferably a butane-1,4-diyl group, a hexane-1,6-diyl group, an octane-1,8-diyl group, a vinylene group, a 1,3-butadiene-1,4diyl group, or a structural isomer thereof.

The proportion of elemental sulfur to the polynuclear aromatic ring compound in the heating processing is preferably 100 parts by mass to 1500 parts by mass, and more preferably 150 parts by mass to 1000 parts by mass, relative to 100 parts by mass of polynuclear aromatic ring compound. The heating temperature is preferably 250° C. to 550° C., and more preferably 300° C. to 450° C. Unreacted elemental sulfur causes a reduction in the cycle characteristics of the secondary battery, and it is therefore preferable to remove unreacted elemental sulfur from the sulfur-modified polynuclear aromatic ring compound by performing, for example, heating, solvent washing, or the like. The amount of sulfur in the sulfur-modified polynuclear aromatic ring compound is preferably 40 to 70 mass %, and more preferably 45 to 60 mass %, because a large charge discharge capacity can be obtained.

The sulfur-modified pitch compound is a compound obtained by heating a pitch and elemental sulfur in a non-oxidizing atmosphere. Examples of the pitch include a petroleum pitch, a coal pitch, a mesophase pitch, asphalt, coal tar, a coal-tar pitch, an organic synthetic pitch obtained through polycondensation of a condensed polycyclic aromatic hydrocarbon compound, an organic synthetic pitch obtained through polycondensation of a heteroatom-containing condensed polycyclic aromatic hydrocarbon compound, and the like. A pitch is a mixture of various compounds and contains a condensed polycyclic aromatic compound. The condensed polycyclic aromatic compound contained in a pitch may be a single compound or may be a plurality of compounds. The condensed polycyclic aromatic compound may contain nitrogen or sulfur in the ring, in addition to carbon and hydrogen. For this reason, the main component of a coal pitch is considered to be a mixture of a condensed polycyclic aromatic hydrocarbon composed only of carbon and hydrogen and a heteroaromatic compound containing nitrogen, sulfur, or the like in the condensed ring.

The proportion of elemental sulfur to the pitch in the heating processing is preferably 100 parts by mass to 1000 parts by mass, and more preferably 150 parts by mass to 500 parts by mass, relative to 100 parts by mass of pitch. The heating temperature is preferably 300° C. to 500° C., and more preferably 350° C. to 500° C. Unreacted elemental sulfur causes a reduction in the cycle characteristics of the secondary battery, and it is therefore preferable to remove unreacted elemental sulfur from the sulfur-modified pitch compound by performing, for example, heating, solvent washing, or the like. The amount of sulfur in the sulfur-modified pitch compound is preferably 25 to 70 mass %, and more preferably 30 to 60 mass %, because a large charge discharge capacity can be obtained.

The polythienoacene compound is a compound having a sulfur-containing polythienoacene structure represented by the general formula (1) below:

[Chemical Formula 1]

(1)

where * represents a bond.

The polythienoacene compound can be obtained by heating an aliphatic polymer compound having a straight-chain structure, such as polyethylene, or a polymer compound having a thiophene structure, such as polythiophene, and elemental sulfur in a non-oxidizing atmosphere.

In the case where an aliphatic polymer compound having a straight-chain structure is used as the raw material for the polythienoacene compound, the proportion of elemental sulfur to the aliphatic polymer compound is preferably 100 parts by mass to 2000 parts by mass, and more preferably 150 parts by mass to 1000 parts by mass, relative to 100 parts by mass of aliphatic polymer compound. Alternatively, in the case where a polymer compound having a thiophene structure is used as the raw material, the proportion of elemental sulfur to the polymer compound having a thiophene structure is preferably 100 parts by mass to 1000 parts by mass, and more preferably 150 parts by mass to 800 parts by mass, relative to 100 parts by mass of polymer compound having a thiophene structure. The heating temperature is preferably 300° C. to 600° C., and more preferably 350° C. to 500° C. Unreacted elemental sulfur causes a reduction in the cycle characteristics of the secondary battery, and it is therefore preferable to remove unreacted elemental sulfur from the polythienoacene compound by performing, for example, heating, solvent washing, or the like. The amount of sulfur in the polythienoacene compound is preferably 30 to 80 mass %, and more preferably 40 to 70 mass %, because a large charge discharge capacity can be obtained.

The sulfur-modified polyether compound is a compound obtained by heating a polyether compound and elemental sulfur in a non-oxidizing atmosphere. Examples of the polyether compound include polyethylene glycol, polypropylene glycol, ethylene oxide/propylene oxide copolymer, polytetramethylene glycol, and the like. The polyether compound may have an alkyl ether group, an alkyl phenyl ether group, or an acyl group at the terminus or may have an ethylene oxide adduct of a polyol such as glycerin or sorbitol at the terminus.

The proportion of elemental sulfur to the polyether compound in the heating processing is preferably 100 parts by mass to 1000 parts by mass, and more preferably 200 parts by mass to 500 parts by mass, relative to 100 parts by mass of polyether compound. The heating temperature is preferably 250° C. to 500° C., and more preferably 300° C. to 450° C. Unreacted elemental sulfur causes a reduction in the cycle characteristics of the secondary battery, and it is therefore preferable to remove unreacted elemental sulfur from the sulfur-modified polyether compound by performing, for example, heating, solvent washing, or the like. The amount of sulfur in the sulfur-modified polyether compound is preferably 30 to 75 mass %, and more preferably 40 to 70 mass %, because a large charge discharge capacity can be obtained.

The sulfur-modified polyamide compound is an organic sulfur compound with a carbon skeleton derived from a polymer having an amide bond, or specifically, a compound obtained by heating an aminocarboxylic acid compound and elemental sulfur, or a polyamine compound, a polycarboxylic acid compound, and elemental sulfur, in a non-oxidizing atmosphere.

In the present invention, the aminocarboxylic acid compound refers to a compound that has one amino group and at least one carboxyl group in a molecule. Examples of the aminocarboxylic acid compound include aminobenzoic acids such as 3,4-diaminobenzoic acid, 3,5-diaminobenzoic acid, p-aminobenzoic acid, and m-aminobenzoic acid, 4-aminophenylacetic acid, 3-aminophenylacetic acid, 3-(4-aminophenyl)propionic acid, 3-aminopropionic acid, 4-aminobutanoic acid, 5-aminopentanoic acid, and 2,5-diaminopentanoic acid, as well as amino acids, such as alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, theanine, tricholomic acid, kainic acid, domoic acid, ibotenic acid, and acromelic acid.

In the present invention, the polyamine compound refers to a compound that has at least two amino groups in a molecule. Examples of the polyamine compound include urea, ethylenediamine, diethylenetriamine, putrescine, cadaverine, hexamethylenediamine, o-phenylenediamine, m-phenylenediamine, p-phenylenediamine, 4-aminobenzene methanamine, 4-aminobenzene ethanamine, melamine, 1,2,4-triaminobenzene, 1,3,5-triaminobenzene, benzoguanamine, and the like.

In the present invention, the polycarboxylic acid compound refers to a compound that has at least two carboxyl groups in a molecule. Examples of the polycarboxylic acid compound include terephthalic acid, fumaric acid, tartaric acid, maleic acid, benzene-1,3-dicarboxylic acid, phthalic acid, oxalic acid, malonic acid, succinic acid, glutaric acid, adipic acid, pimelic acid, suberic acid, azelaic acid, sebacic acid, ethylenediaminetetraacetic acid, and the like. Other examples include phthalic anhydride, maleic anhydride, and the like, and the polycarboxylic acid compound may be an acid anhydride. When producing the sulfur-modified polyamide compound using a polyamine compound and a polycarboxylic acid compound, it is preferable that the ratio of the polyamine compound and the polycarboxylic acid compound is 0.9 to 1.1 in terms of molar ratio.

The proportion of elemental sulfur to the aminocarboxylic acid compound in the heating processing is preferably 100 parts by mass to 500 parts by mass, and more preferably 150 parts by mass to 400 parts by mass, relative to 100 parts by mass of aminocarboxylic acid compound. The proportion of elemental sulfur to the polyamine compound and the polycarboxylic acid compound is preferably 100 parts by mass to 500 parts by mass, and more preferably 150 parts by mass to 400 parts by mass, relative to 100 parts by mass of the total mass of the polyamine compound and the polycarboxylic acid compound. The heating temperature is preferably 250° C. to 600° C., and more preferably 350° C. to 500° C. Unreacted elemental sulfur causes a reduction in the cycle characteristics of the secondary battery, and it is therefore preferable to remove unreacted elemental sulfur from the sulfur-modified polyamide compound by performing, for example, heating, solvent washing, or the like. The amount of sulfur in the sulfur-modified polyamide compound is preferably 40 to 70 mass %, and more preferably 45 to 60 mass %, because a large charge discharge capacity can be obtained.

The sulfur-modified aliphatic hydrocarbon oxide is a compound obtained by heating an aliphatic hydrocarbon oxide and elemental sulfur in a non-oxidizing atmosphere. In the present invention, the aliphatic hydrocarbon oxide refers to a compound that has an aliphatic hydrocarbon skeleton and has at least one group selected from the group consisting of a hydroxyl group, a carbonyl group, a carboxyl group, and an epoxy group, and the hydrocarbon skeleton may have an unsaturated bond. The aliphatic hydrocarbon skeleton of the aliphatic hydrocarbon oxide may be a straight chain or a branched chain, but it is preferable that the aliphatic hydrocarbon skeleton is a straight chain, because a large charge discharge capacity can be obtained. The aliphatic hydrocarbon oxide has preferably 4 to 12 carbon atoms, and more preferably 6 to 10 carbon atoms, because a large charge discharge capacity can be obtained. Oxygen atoms in the aliphatic hydrocarbon oxide detach therefrom through heating with elemental sulfur, and therefore, the ratio of the number of carbon atoms to the number of oxygen atoms in the aliphatic hydrocarbon oxide is preferably 3 or greater, and more preferably 4 or greater.

Preferred aliphatic hydrocarbon oxides may be alcoholic compounds such as 1-butanol, 2-butanol, 1-pentanol, 3-pentanol, 1-hexanol, 1-heptanol, 1-octanol, 1-nonanol, 1-decanol, 1-butanol, 1-pentanol, 1-hexanol, 1-heptanol, 1-octanol, 2-octanol, 1-nonanol, and 1-decanol; aldehyde compounds such as butanal, pentanal, hexanal, heptanal, octanal, nonanal, and decanal; ketone compounds such as methyl ethyl ketone, diethyl ketone, and methyl hexyl ketone; carboxylic acid compounds such as octanoic acid, nonanoic acid, and decanoic acid; epoxy compounds such as 1,2-butane oxide, 1,2-hexane oxide, 1,2-octane oxide, and 1,2-decane oxide; and the like.

The proportion of elemental sulfur to the aliphatic hydrocarbon oxide in the heating processing is preferably 100 parts by mass to 1000 parts by mass, and more preferably 200 parts by mass to 500 parts by mass, relative to 100 parts by mass of aliphatic hydrocarbon oxide. The heating temperature is preferably 300° C. to 500° C., and more preferably 350° C. to 450° C. If the heating temperature is higher than the boiling point of the aliphatic hydrocarbon oxide, it is preferable to perform the production while refluxing the aliphatic hydrocarbon oxide. Unreacted elemental sulfur causes a reduction in the cycle characteristics of the secondary battery, and it is therefore preferable to remove unreacted elemental sulfur from the sulfur-modified aliphatic hydrocarbon oxide by performing, for example, heating, solvent washing, or the like. The amount of sulfur in the sulfur-modified aliphatic hydrocarbon oxide is preferably 45 to 75 mass %, and more preferably 50 to 70 mass %, because a large charge discharge capacity can be obtained.

In the case where the heating processing of an organic compound and sulfur is performed under a non-oxidizing atmosphere, the non-oxidizing atmosphere may be an atmosphere in which the concentration of oxygen in the gas phase is 5 vol % or less, or preferably 2 vol % or less, or more preferably an atmosphere in which substantially no oxygen is contained, such as an inert gas, for example, nitrogen, helium, or argon, atmosphere or a sulfur gas atmosphere.

Preferably, the organo sulfur-based electrode active material of the present invention contains sodium and potassium in a total amount of 100 ppm by mass to 1000 ppm by mass. A total amount of sodium and potassium that is less than 100 ppm by mass or greater than 1000 ppm by mass may cause a reduction in the initial efficiency and the rate characteristics.

In the present invention, the "initial efficiency" refers to the ratio of discharge capacity to charge capacity in the first charge discharge cycle of a battery that has not been subjected to any charge discharge cycle, and the higher the initial efficiency, the superior the charge discharge efficiency of the battery. On the other hand, the "rate characteristics" refers to the ratio of the discharge capacity when a battery is discharged at a high current to the discharge capacity when the battery is discharged at a low current, and higher rate characteristics indicate that the battery can be used even if it is discharged at a large current. For example, in automotive applications, an automobile temporarily requires a large current in order to immediately accelerate when moving off, and it is therefore important to improve the rate characteristics.

The total amount of sodium and potassium in the organo sulfur-based electrode active material of the present invention is preferably 200 ppm by mass to 800 ppm by mass, more preferably 300 ppm by mass to 700 ppm by mass, and most preferably 400 ppm by mass to 650 ppm by mass.

The method for obtaining the organo sulfur-based electrode active material of the present invention is not particularly limited, but a method is preferred in which the mixture of the raw material organic compound and elemental sulfur prior to heating contains sodium and/or potassium, and this mixture is heat-treated. In the organo sulfur-based electrode active material, as a result of the heating processing of the raw material organic compound and sulfur, hydrogen and oxygen detach from the raw material organic compound, and sulfur substitutes for, or is added to, the remaining carbon and nitrogen. For this reason, the amount of sodium and/or potassium in the mixture of the raw material organic compound and elemental sulfur can be determined with consideration given to the amounts of carbon atoms and nitrogen atoms in the raw material organic compound, the reaction yield of the organo sulfur-based electrode active material, the amount of sulfur in the organo sulfur-based electrode active material, and the like. The total amount of sodium and potassium in the organo sulfur-based electrode active material can be adjusted to 100 ppm by mass to 1000 ppm by mass by adding a sodium compound and/or a potassium compound to the mixture of the raw material organic compound and elemental sulfur if the raw material organic compound contains neither sodium nor potassium, or by using a sodium compound and/or a potassium compound, or a raw material organic compound containing neither sodium nor potassium, as necessary, if the raw material organic compound contains sodium and/or potassium.

Preferably, a raw material organic compound containing sodium and/or potassium is used in the organo sulfur-based electrode active material of the present invention, because variation in performance can be reduced. The raw material organic compound containing sodium and/or potassium can be obtained by producing a raw material organic compound in the presence of a sodium compound and/or a potassium compound. Alternatively, the raw material organic compound containing sodium and/or potassium can also be obtained using a method in which a sodium compound and/or a potassium compound is dissolved in, or impregnated with, a raw material organic compound. When dissolving or impregnating a sodium compound and/or a potassium compound in or with a raw material organic compound, a solvent can be used as necessary. Hereinafter, a case where the organo sulfur-based electrode active material is sulfur-modified polyacrylonitrile will be described.

A polyacrylonitrile containing neither sodium nor potassium is obtained by polymerizing acrylonitrile with use of a radical polymerization initiator containing neither of both. Examples of this radical polymerization initiator include peroxides such as benzoyl peroxide; azo compounds such as azobisdimethylvaleronitrile and azobisisobutyronitrile; a redox catalyst composed of an oxidizing agent and a reducing agent that contain neither sodium nor potassium; and the like. Examples of the oxidizing agent include hydrogen peroxide, ammonium persulfate, ammonium percarbonate, and the like. Examples of the reducing agent include ascorbic acid, erythorbic acid, ferrous sulfate, ferrous chloride, and the like.

When adding a compound containing sodium and/or potassium to the polyacrylonitrile containing neither sodium nor potassium, a method can be employed in which a compound containing sodium or a compound containing potassium, or both are added to a solution obtained by polymerizing acrylonitrile through solution polymerization with use of a radical polymerization initiator containing neither sodium nor potassium, and then, polyacrylonitrile is isolated by removing the solvent. Another method can also be employed in which the polyacrylonitrile containing neither sodium nor potassium is dissolved in an organic solvent, a compound containing sodium or a compound containing potassium, or both are added to the solution, and then, polyacrylonitrile is isolated by removing the solvent.

Examples of the compounds containing sodium or potassium include a sodium salt or a potassium salt of fatty acid, a sodium salt or a potassium salt of alkylsulfonic acid, a sodium salt or a potassium salt of aryl acid, and the like, and a compound that can be dissolved in a solution of polyacrylonitrile can be used without limitation.

Regarding the method for using a compound containing sodium or a compound containing potassium, or both when polymerizing acrylonitrile, the polymerization can be performed using a radical polymerization initiator, a dispersion stabilizer, an emulsifier, or the like that contains sodium or potassium.

An example of the radical polymerization initiator containing sodium or potassium is a redox catalyst in which at least one of the oxidizing agent and the reducing agent contains sodium or potassium. Examples of the oxidizing agent containing sodium or potassium include sodium persulfate, potassium persulfate, and the like. Examples of the reducing agent containing sodium or potassium include sodium hydrogen sulfite, potassium hydrogen sulfite, and the like.

Examples of the dispersion stabilizer containing sodium or potassium include a sodium salt or a potassium salt of carboxymethyl cellulose, a sodium salt or a potassium salt of polyacrylic acid, and the like.

Examples of the emulsifier containing sodium or potassium include a sodium salt or a potassium salt of alkylsulfonic acid, a sodium salt or a potassium salt of alkylbenzene sulfonic acid, a sodium salt or a potassium salt of an alkyl sulfate ester, and the like.

A known method can be used as the method for polymerizing acrylonitrile with use of any of these compounds.

Since polyacrylonitrile is unlikely to cause a depolymerization reaction and is also highly reactive with sulfur, the reaction yield of sulfur-modified polyacrylonitrile is stable. Therefore, as long as the amount of sodium and potassium relative to the amount of polyacrylonitrile in the mixture of polyacrylonitrile and sulfur prior to the heating processing, and the amount of sulfur in the resulting sulfur-modified polyacrylonitrile are stable, a sulfur-modified polyacrylonitrile in which the amount of sodium and potassium is stable can be obtained. For example, when the total amount of sodium and potassium relative to the amount of polyacrylonitrile in the mixture of polyacrylonitrile and sulfur prior to the heating processing is 800 ppm by mass, if an adjustment is made so that the amount of sulfur in the resulting sulfur-modified polyacrylonitrile becomes 40 mass %, a sulfur-modified polyacrylonitrile containing sodium and potassium in a total amount of about 500 ppm by mass can be obtained. In order to obtain a sulfur-modified polyacrylonitrile containing sulfur in an amount of 25 mass % to 60 mass % and sodium and potassium in a total amount of 100 ppm by mass to 1000 ppm by mass, the total amount of sodium and potassium relative to the amount of polyacrylonitrile in the mixture of polyacrylonitrile and sulfur prior to the heating processing is preferably 126 ppm by mass to 2360 ppm by mass, and it is preferable that a polyacrylonitrile containing sodium and potassium in a total amount of 126 ppm by mass to 2360 ppm by mass is used as the polyacrylonitrile.

Preferably, the organo sulfur-based electrode active material of the present invention further contains iron in an amount of 1 ppm by mass to 20 ppm by mass, and more preferably 2 ppm by mass to 10 ppm by mass, because the initial efficiency can be improved.

As the method for obtaining the organo sulfur-based electrode active material of the present invention that contains iron in an amount of 1 ppm by mass to 20 ppm by mass, a method in which a raw material organic compound containing iron is used; a method in which an iron-containing compound is added to the mixture of the raw material organic compound and elemental sulfur, and the resulting mixture is heated; and other methods can be used. It is preferable to use the method in which a raw material organic compound containing iron is used, because variation in the performance can be reduced. The raw material organic compound containing iron can be obtained by producing a raw material organic compound in the presence of an iron compound. Alternatively, the raw material organic compound containing iron can also be obtained using a method in which an iron compound is dissolved in or impregnated with a raw material organic compound. When dissolving or impregnating the iron compound in or with the raw material organic compound, a solvent can be used as necessary. Hereinafter, a case in which the organo sulfur-based electrode active material is sulfur-modified polyacrylonitrile will be described.

A polyacrylonitrile produced by adding an iron-containing compound to a polyacrylonitrile that does not contain iron can be used as the polyacrylonitrile containing iron. Alternatively, a polyacrylonitrile obtained by using an iron-containing compound during the polymerization of acrylonitrile may also be used. The polyacrylonitrile obtained by using an iron-containing compound during the polymerization of acrylonitrile can be produced by, for example, polymerizing acrylonitrile with use of a redox catalyst composed of a combination of an oxidizing agent containing sodium or potassium and a reducing agent containing iron, such as ferrous sulfate or ferrous chloride, out of the above-described polyacrylonitriles containing sodium or potassium.

In order to obtain a sulfur-modified polyacrylonitrile containing sulfur in an amount of 25 mass % to 60 mass % and iron in an amount of 1 ppm by mass to 20 ppm by mass, it is preferable to use a polyacrylonitrile containing iron in an amount of 1.3 ppm by mass to 47 ppm by mass.

Preferably, the average particle size of the organo sulfur-based electrode active material of the present invention is adjusted according to the purpose of use. For example, if the organo sulfur-based electrode active material is used as an electrode active material of an electrode in a secondary battery, the average particle size is preferably 0.5 µm to 100 µm.

The term "average particle size" refers to a 50% particle size measured using a laser diffraction light scattering method. The term "particle size" refers to diameter based on volume. In the laser scattering light diffraction method, the diameter of secondary particles is measured.

To reduce the average particle size of the organo sulfur-based electrode active material to less than 0.5 µm, a large amount of effort is required for pulverization or the like, and a further improvement in battery performance cannot be expected. On the other hand, if the average particle size is greater than 100 µm, a smooth electrode material mixture layer may not be obtained. The average particle size of the organo sulfur-based electrode active material of the present invention is preferably 0.5 µm to 100 µm, more preferably 1 µm to 50 µm, and even more preferably 2 µm to 30 µm.

The organo sulfur-based electrode active material of the present invention can be favorably used as an electrode active material contained in an electrode of a non-aqueous electrolyte secondary battery. Specifically, an electrode in which an electrode material mixture layer containing the organo sulfur-based electrode active material of the present invention is formed on a current collector can be favorably used as an electrode of a non-aqueous solvent secondary battery.

The electrode material mixture layer can be formed by applying a slurry onto the current collector and drying the slurry, the slurry being prepared by adding the organo sulfur-based electrode active material of the present invention, a binder, and a conductive aid to a solvent.

As the binder, a known binder used for an electrode can be used. Examples include styrene-butadiene rubber, butadiene rubber, polyethylene, polypropylene, polyamide, polyamide imide, polyimide, polyacrylonitrile, polyurethane, polyvinylidene fluoride, polytetrafluoroethylene, ethylene-propylene-diene rubber, fluorine rubber, styrene-acrylic acid ester copolymer, ethylene-vinyl alcohol copolymer, acrylonitrile butadiene rubber, styrene-isoprene rubber, polymethyl methacrylate, polyacrylate, polyvinyl alcohol, polyvinyl ether, carboxymethyl cellulose, carboxymethyl cellulose sodium, methyl cellulose, cellulose nanofibers, polyethylene oxide, starch, polyvinyl pyrrolidone, polyvinyl chloride, polyacrylic acid, and the like.

As the binder, it is preferable to use a water-based binder because a water-based binder has low environmental burden and is unlikely to cause sulfur to dissolve, and it is particularly preferable to use styrene-butadiene rubber, carboxymethyl cellulose sodium, and polyacrylic acid. These binders may be used alone or in a combination of two or more.

The amount of binder in the slurry is preferably 1 part by mass to 30 parts by mass, and more preferably 1 part by mass to 20 parts by mass, relative to 100 parts by mass of organo sulfur-based electrode active material of the present invention.

As the conductive aid, a known conductive aid used for an electrode can be used. Specific examples include carbon materials such as natural graphite, artificial graphite, carbon black, Ketjen black, acetylene black, channel black, furnace black, lamp black, thermal black, carbon nanotubes, vapor grown carbon fibers (VGCF), graphene, fullerene, and needle coke; metal powders such as an aluminum powder, a nickel powder, and a titanium powder; conductive metal oxides such as zinc oxide and titanium oxide; and sulfides such as $La_2S_3$, $Sm_2S_3$, $Ce_2S_3$, and $TiS_2$.

The average particle size of the conductive aid is preferably 0.0001 µm to 100 µm, and more preferably 0.01 µm to 50 µm.

The amount of conductive aid in the slurry is normally 0.1 parts by mass to 50 parts by mass, preferably 1 part by mass to 30 parts by mass, and more preferably 2 parts by mass to 20 parts by mass, relative to 100 parts by mass of organo sulfur-based electrode active material of the present invention.

Examples of the solvent used to prepare the slurry include propylene carbonate, ethylene carbonate, diethyl carbonate, dimethyl carbonate, ethyl methyl carbonate, 1,2-dimethoxyethane, 1,2-diethoxyethane, acetonitrile, propionitrile, tetrahydrofuran, 2-methyl tetrahydrofuran, dioxane, 1,3-dioxolane, nitromethane, N-methyl pyrrolidone, N,N-dimethyl formamide, dimethyl acetamide, methyl ethyl ketone, cyclohexanone, methyl acetate, methyl acrylate, diethyl triamine, N,N-dimethylaminopropylamine, polyethylene oxide, tetrahydrofuran, dimethylsulfoxide, sulfolane, γ-butyrolactone, water, alcohol, and the like. The amount of solvent used can be adjusted according to the method for applying the slurry. For example, in the case of a doctor blade method, the amount of solvent is preferably 20 parts by mass to 300 parts by mass, and more preferably 30 parts by mass to 200 parts by mass, relative to 100 parts by mass of the total amount of the organo sulfur-based electrode active material, the binder, and the conductive aid.

The slurry may contain other components in addition to the above-described components. Examples of other components include a viscosity adjusting agent, a reinforcing material, an antioxidant, and the like.

There is no particular limitation on the method for preparing the slurry. For example, a method that uses an ordinary ball mill, a sand mill, a bead mill, a pigment disperser, a mortar grinder, an ultrasonic disperser, a homogenizer, a rotation/revolution mixer, a planetary mixer, Filmix, Jet Paster, or the like can be used.

As the material of the current collector, conductive materials such as titanium, a titanium alloy, aluminum, an aluminum alloy, copper, nickel, stainless steel, and nickel-plated steel are used. The surface of these conductive materials may be coated with carbon. The current collector may be in the form of a foil, a plate, a mesh, or the like. Among these, aluminum and copper are preferable, and the form of a foil is preferable, from the viewpoint of conductivity and cost. In the case where the current collector is in the form of a foil, the thickness of the foil is normally 1 µm to 100 µm.

There is no particular limitation on the method for applying the slurry to the current collector, and various methods can be used such as a die coater method, a comma coater method, a curtain coater method, a spray coater method, a gravure coater method, a flexo coater method, a knife coater method, a doctor blade method, a reverse roll method, a brush application method, and a dipping method. It is preferable to use a die coater method, a doctor blade method, and a knife coater method because a coating layer with a good surface state can be obtained according to the physical properties, such as viscosity, and the drying properties of the slurry.

The slurry can be applied to one surface or both surfaces of the current collector. In the case where the slurry is applied to both surfaces of the current collector, the slurry may be applied first to one surface and then to the other, or simultaneously to both surfaces. Also, the slurry may be applied continuously or intermittently to the surface of the current collector, or may be applied in the form of a stripe. The thickness, the length, and the width of the coating layer can be determined as appropriate according to the battery size.

There is no particular limitation on the method for drying the slurry applied to the current collector, and various methods can be used such as drying with warm air, hot air or low-moisture air, vacuum drying, placing in a heating furnace or the like, and irradiation with far-infrared rays, infrared rays, electron beams, or the like. By drying the slurry, volatile components such as the solvent volatilize from the coating film made using the slurry, and an electrode material mixture layer is formed on the current collector. After that, the electrode may be pressed as needed. As the pressing method, for example, a die pressing method or a roll pressing method may be used.

The electrode of the present invention has the same configuration as that of a known electrode. Specifically, the electrode of the present invention includes a current collector and an electrode material mixture layer formed on the current collector. The electrode material mixture layer contains the organo sulfur-based electrode active material of the present invention.

The electrode of the present invention can be used in, without limitation, a non-aqueous secondary battery that includes a non-aqueous electrolyte. The non-aqueous electrolyte may be any of a liquid electrolyte, a gel electrolyte, a solid electrolyte, and the like. The electrode of the present invention can be more favorably used in a lithium ion secondary battery. The electrode of the present invention can be used as a positive electrode or a negative electrode.

In general, a non-aqueous electrolyte secondary battery is constituted by a positive electrode, a negative electrode, a non-aqueous electrolyte, and a separator. In the case where the electrode of the present invention is used as the positive electrode, an electrode containing a known negative electrode active material can be used as the negative electrode. In the case where the electrode of the present invention is used as the negative electrode, an electrode containing a known positive electrode active material can be used as the positive electrode. The negative electrode in the case where the electrode of the present invention is used as the positive electrode, or the positive electrode in the case where the electrode of the present invention is used as the negative electrode, will be referred to as the "counter electrode".

Examples of the known negative electrode active material include natural graphite, artificial graphite, non-graphitizable carbon, graphitizable carbon, lithium, a lithium alloy, silicon, a silicon alloy, silicon oxide, tin, a tin alloy, tin oxide, phosphorus, germanium, indium, copper oxide, antimony sulfide, titanium oxide, iron oxide, manganese oxide, cobalt oxide, nickel oxide, lead oxide, ruthenium oxide, tungsten oxide, and zinc oxide. Other examples include composite oxides such as $LiVO_2$, $Li_2VO_4$, and $Li_4Ti_5O_{12}$. These negative electrode active materials may be used alone or in a combination of two or more.

Examples of the known positive electrode active material include a lithium transition metal composite oxide, a lithium-containing transition metal phosphoric acid compound, a lithium-containing silicate compound, and the like.

The transition metal contained in the lithium transition metal composite oxide is preferably vanadium, titanium, chromium, manganese, iron, cobalt, nickel, copper, or the like. Specific examples of the lithium transition metal composite oxide include lithium cobalt composite oxides such as $LiCoO_2$; lithium nickel composite oxides such as $LiNiO_2$; lithium manganese composite oxides such as $LiMnO_2$, $LiMn_2O_4$, $Li_2MnO_3$; lithium transition metal composite oxides in which some of the atoms of the main transition metal are substituted by other metals such as aluminum, titanium, vanadium, chromium, manganese, iron, cobalt, lithium, nickel, copper, zinc, magnesium, gallium, and zirconium; and the like. Specific examples of the lithium transition metal composite oxides in which some of the atoms of the main transition metal are substituted by other metals include $Li_{1.1}Mn_{1.8}Mg_{0.1}O_4$, $Li_{1.1}Mn_{1.85}Al_{0.05}O_4$, $LiNi_{0.5}Co_{0.2}Mn_{0.3}O_2$, $LiNi_{0.8}Co_{0.1}Mn_{0.1}O_2$, $LiNi_{0.5}Mn_{0.5}O_2$, $LiNi_{0.80}Co_{0.17}Al_{0.03}O_2$, $LiNi_{0.80}Co_{0.15}Al_{0.05}O_2$, $Li(Ni_{1/3}Co_{1/3}Mn_{1/3})O_2$, $LiNi_{0.6}Co_{0.2}Mn_{0.2}O_2$, $LiMn_{1.8}Al_{0.2}O_4$, $LiNi_{0.5}Mn_{1.5}O_4$, $Li_2MnO_3$—$LiMO_2$ (M=Co, Ni, or Mn), and the like.

The transition metal contained in the lithium-containing transition metal phosphoric acid compound is preferably vanadium, titanium, manganese, iron, cobalt, nickel, or the like. Specific examples include iron phosphate compounds such as $LiFePO_4$ and $LiMn_xFe_{1-x}PO_4$ (0<x<1); iron sulfate compounds such as $LiFeSO_4F$; cobalt phosphate compounds such as $LiCoPO_4$; lithium-containing transition metal phosphoric acid compounds in which some of the atoms of the main transition metal are substituted by other metals such as aluminum, titanium, vanadium, chromium, manganese, iron, cobalt, lithium, nickel, copper, zinc, magnesium, gallium, zirconium, and niobium; vanadium phosphate compounds such as $Li_3V_2(PO_4)_3$; and the like.

Examples of the lithium-containing silicate compound include $Li_2FeSiO_4$ and the like. These positive electrode active materials may be used alone or in a combination of two or more.

The counter electrode can be produced by replacing the above-described sulfur-modified polyacrylonitrile of the present invention with the above-described known negative electrode active material or known positive electrode active material.

Examples of the non-aqueous electrolyte include a liquid electrolyte obtained by dissolving an electrolyte in an organic solvent; a polymer gel electrolyte obtained by dissolving an electrolyte in an organic solvent and gelling the solution with a polymer; a pure polymer electrolyte obtained by dispersing an electrolyte in a polymer, without containing an organic solvent; an inorganic solid electrolyte; and the like.

As the electrolyte used in the liquid electrolyte or the polymer gel electrolyte, for example, a conventionally known lithium salt can be used. Examples include $LiPF_6$, $LiBF_4$, $LiAsF_6$, $LiCF_3SO_3$, $LiCF_3CO_2$, $LiN(CF_3SO_2)_2$, $LiN(C_2F_5SO_2)_2$, $LiN(SO_2F)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, $LiSCN$, $LiClO_4$, $LiCl$, $LiF$, $LiBr$, $LiI$, $LiAlF_4$, $LiAlCl_4$, $LiPO_2F_2$, derivatives thereof, and the like. Among these, it is preferable to use one or more selected from the group consisting of $LiPF_6$, $LiBF_4$, $LiClO_4$, $LiAsF_6$, $LiCF_3SO_3$, $LiN(CF_3SO_2)_2$, $LiN(C_2F_5SO_2)_2$, $LiN(SO_2F)_2$, $LiC(CF_3SO_2)_3$, derivatives of $LiCF_3SO_3$, and derivatives of $LiC(CF_3SO_2)_3$.

The amount of electrolyte in the liquid electrolyte or the polymer gel electrolyte is preferably 0.5 to 7 mol/L, and more preferably 0.8 to 1.8 mol/L.

Examples of the electrolyte used in the pure polymer electrolyte include $LiN(CF_3SO_2)_2$, $LiN(C_2F_5SO_2)_2$, $LiN(SO_2F)_2$, $LiC(CF_3SO_2)_3$, $LiB(CF_3SO_3)_4$, and $LiB(C_2O_4)_2$.

Examples of the inorganic solid electrolyte include: phosphoric acid-based materials such as $Li_{1+x}A_xB_{2-y}(PO_4)_3$ (A=Al, Ge, Sn, Hf, Zr, Sc, or Y, B=Ti, Ge, or Zn, and $0<x<0.5$), $LiMPO_4$ (M=Mn, Fe, Co, or Ni), and $Li_3PO_4$; lithium composite oxides such as $Li_3XO_4$ (X=As or V), $Li_{3+x}A_xB_{1-x}O_4$ (A=Si, Ge, or Ti, B=P, As, or V, and $0<x<0.6$), $Li_{4+x}A_xSi_{1-x}O_4$ (A=B, Al, Ga, Cr, or Fe, and $0<x<0.4$) (A=Ni or Co, and $0<x<0.1$), $Li_{4-3y}Al_ySiO_4$ ($0<y<0.06$), $Li_{4-2y}Zn_yGeO_4$ ($0<y<0.25$), $LiAlO_2$, $Li_2BO_4$, $Li_4XO_4$ (X=Si, Ge, or Ti), and lithium titanates ($LiTiO_2$, $LiTi_2O_4$, $Li_4TiO_4$, $Li_2TiO_3$, $Li_2Ti_3O_7$, and $Li_4Ti_5O_{12}$); compounds that contain lithium and a halogen such as LiBr, LiF, LiCl, $LiPF_6$, and $LiBF_4$; compounds that contain lithium and nitrogen such as LiPON, $LiN(SO_2CF_3)_2$, $LiN(SO_2C_2F_5)_2$, $Li_3N$, and $LiN(SO_2C_3F_7)_2$; crystals with a lithium ion conductive perovskite structure such as $La_{0.55}Li_{0.35}TiO_3$; crystals with a garnet-type structure such as $Li_7$—$La_3Zr_2O_{13}$; glass such as $50Li_4SiO_4 \cdot 50Li_3BO_3$; lithium·phosphorus sulfide-based crystals such as $Li_{10}GeP_2S_{12}$ and $Li_{3.25}Ge_{0.25}P_{0.75}S_4$; lithium·phosphorus sulfide-based glass such as $30Li_2S \cdot 26B_2S_3 \cdot 44LiI$, $63Li_2S \cdot 36SiS_2 \cdot 1Li_3PO_4$, $57Li_2S \cdot 38SiS_2 \cdot 5Li_4SiO_4$, $70Li_2S \cdot 50GeS_2$, and $50Li_2S \cdot 50GeS_2$; glass ceramics such as $Li_7P_3S_{11}$, $Li_{3.25}P_{0.95}S_4$; and the like.

As the organic solvent used to prepare the liquid non-aqueous electrolyte used in the present invention, organic solvents that are normally used in liquid non-aqueous electrolytes can be used alone or in a combination of two or more. Specific examples include a saturated cyclic carbonate compound, a saturated cyclic ester compound, a sulfoxide compound, a sulfone compound, an amide compound, a saturated chain carbonate compound, a chain ether compound, a cyclic ether compound, a saturated chain ester compound, and the like.

Among the organic solvents listed above, a saturated cyclic carbonate compound, a saturated cyclic ester compound, a sulfoxide compound, a sulfone compound, and an amide compound have a high relative dielectric constant and hence function to increase the dielectric constant of the non-aqueous electrolyte. In particular, it is preferable to use a saturated cyclic carbonate compound.

Examples of the saturated cyclic carbonate compound include ethylene carbonate, 1,2-propylene carbonate, 1,3-propylene carbonate, 1,2-butylene carbonate, 1,3-butylene carbonate, 1,1-dimethylethylene carbonate, and the like.

Examples of the saturated cyclic ester compound include γ-butyrolactone, γ-valerolactone, γ-caprolactone, δ-hexanolactone, δ-octanolactone, and the like. Examples of the sulfoxide compound include dimethyl sulfoxide, diethyl sulfoxide, dipropyl sulfoxide, diphenyl sulfoxide, thiophene, and the like.

Examples of the sulfone compound include dimethyl sulfone, diethyl sulfone, dipropyl sulfone, diphenyl sulfone, sulfolane (also referred to as tetramethylene sulfone), 3-methyl sulfolane, 3,4-dimethylsulfolane, 3,4-diphenymethyl sulfolane, sulfolene, 3-methyl sulfolene, 3-ethyl sulfolene, 3-bromomethyl sulfolene, and the like. It is preferable to use sulfolane and tetramethyl sulfolane.

Examples of the amide compound include N-methyl pyrrolidone, dimethyl formamide, dimethyl acetamide, and the like.

Among the organic solvents listed above, a saturated chain carbonate compound, a chain ether compound, a cyclic ether compound, and a saturated chain ester compound can contribute to reducing the viscosity of the non-aqueous electrolyte, increasing the mobility of electrolyte ions, and the like, as well as providing excellent battery characteristics such as output density. Also, these compounds have a low viscosity and can therefore enhance the performance of the non-aqueous electrolyte at low temperatures. In particular, it is preferable to use a saturated chain carbonate compound.

Examples of the saturated chain carbonate compound include dimethyl carbonate, ethyl methyl carbonate, diethyl carbonate, ethyl butyl carbonate, methyl-t-butyl carbonate, diisopropyl carbonate, t-butylpropyl carbonate, and the like.

Examples of the chain ether compound and the cyclic ether compound include dimethoxyethane, ethoxy methoxy ethane, diethoxyethane, tetrahydrofuran, dioxolane, dioxane, 1,2-bis(methoxycarbonyloxy)ethane, 1,2-bis(ethoxycarbonyloxy)ethane, 1,2-bis(ethoxycarbonyloxy) propane, ethylene glycol bis(trifluoroethyl)ether, propylene glycol bis(trifluoroethyl)ether, ethylene glycol bis(trifluoromethyl)ether, diethylene glycol bis(trifluoroethyl)ether, and the like. Among these, it is preferable to use dioxolane.

As the saturated chain ester compound, it is preferable to use a monoester compound in which the total number of carbon atoms in a molecule is 2 to 8 and a diester compound in which the total number of carbon atoms in a molecule is 2 to 8. Specific compounds include methyl formate, ethyl formate, methyl acetate, ethyl acetate, propyl acetate, isobutyl acetate, butyl acetate, methyl propionate, ethyl propionate, methyl butyrate, methyl isobutyrate, trimethyl methyl acetate, trimethyl ethyl acetate, methyl malonate, ethyl malonate, methyl succinate, ethyl succinate, methyl 3-methoxypropionate, ethyl 3-methoxypropionate, ethylene glycol diacetyl, propylene glycol diacetyl, and the like. It is preferable to use methyl formate, ethyl formate, methyl acetate, ethyl acetate, propyl acetate, isobutyl acetate, butyl acetate, methyl propionate, and ethyl propionate.

Other examples of the organic solvent used to prepare the non-aqueous electrolyte include acetonitrile, propionitrile, nitromethane, derivatives thereof, and various types of ionic liquids.

Examples of the polymer used in the polymer gel electrolyte include polyethylene oxide, polypropylene oxide, polyvinyl chloride, polyacrylonitrile, polymethyl methacrylate, polyethylene, polyvinylidene fluoride, polyhexafluoropropylene, and the like. Examples of the polymer used in the pure polymer electrolyte include polyethylene oxide, polypropylene oxide, and polystyrene sulfonate. There is no particular limitation on the mixing ratio of the polymer in the gel electrolyte and the composite forming method, and a mixing ratio and a composite forming method that are known in the art can be used.

In order to achieve improvement in battery life, safety, and the like, the non-aqueous electrolyte may contain other known additives such as, for example, an electrode coating film forming agent, an antioxidant, a flame retardant, and an overcharge protecting agent. In the case where other additives are used, the amount of other additives relative to the total amount of the non-aqueous electrolyte is normally 0.01 parts by mass to 10 parts by mass, and preferably 0.1 parts by mass to 5 parts by mass.

As the separator, a micro-porous polymer film normally used in a non-aqueous electrolyte secondary battery can be used without any particular limitation. Examples of the film include films that are made of polyethers such as polyethylene, polypropylene, polyvinylidene fluoride, polyvinylidene chloride, polyacrylonitrile, polyacrylamide, polytetrafluoroethylene, polysulfone, polyether sulfone, polycarbonate, polyamide, polyimide, polyethylene oxide, and polypropylene oxide; various types of celluloses such as carboxymethyl cellulose and hydroxypropyl cellulose; polymer compounds composed mainly of poly(meth) acrylic acid and various types of esters thereof; derivatives of the polymer compounds; and copolymers and mixtures thereof; and the like. These films may be coated with a ceramic material such as alumina or silica, magnesium oxide, aramid resin, or polyvinylidene fluoride.

These films can be used alone, or stacked and used as a multilayer film. Furthermore, these films may contain various types of additives, and there is no particular limitation on the type and the amount of additives. Among these films, in a secondary battery produced using a method for producing a secondary battery, a film made of polyethylene, polypropylene, polyvinylidene fluoride, or polysulfone is preferably used. In the case where the non-aqueous solvent electrolyte is a pure polymer electrolyte or an inorganic solid electrolyte, the separator may be omitted.

Figure 1:
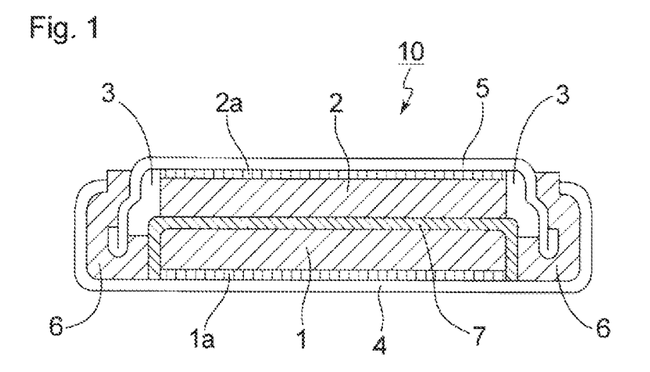
FIG. 1 is a vertical cross-sectional view schematically showing an example of the structure of a coin type non-aqueous electrolyte secondary battery of the present invention.

There is no particular limitation on the shape of a secondary battery that is produced using the method for producing a secondary battery having the above-described configuration, and the secondary battery may have various shapes such as a coin shape, a cylindrical shape, a rectangular shape, and a laminate battery shape. FIG. 1 shows an example of a coin-type non-aqueous electrolyte secondary battery of the present invention, and FIGS. 2 and 3 show an example of a cylindrical non-aqueous electrolyte secondary battery of the present invention.

In a coin-type non-aqueous electrolyte secondary battery 10 shown in FIG. 1, 1 denotes a positive electrode that can release lithium ions, 1a denotes a positive electrode current collector, 2 denotes a negative electrode that can occlude and release lithium ions released from the positive electrode, 2a denotes a negative electrode current collector, 3 denotes a non-aqueous electrolyte, 4 denotes a positive electrode case made of stainless steel, 5 denotes a negative electrode case made of stainless steel, 6 denotes a gasket made of polypropylene, and 7 denotes a separator made of polyethylene.

Figure 2:
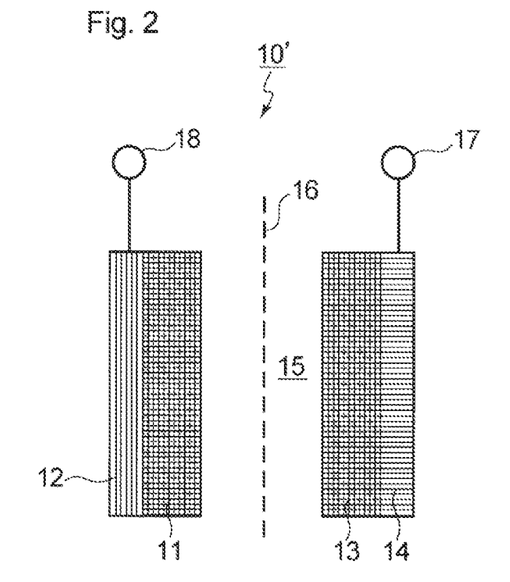
FIG. 2 is a schematic diagram showing the basic configuration of a cylindrical non-aqueous electrolyte secondary battery of the present invention.
Figure 3:
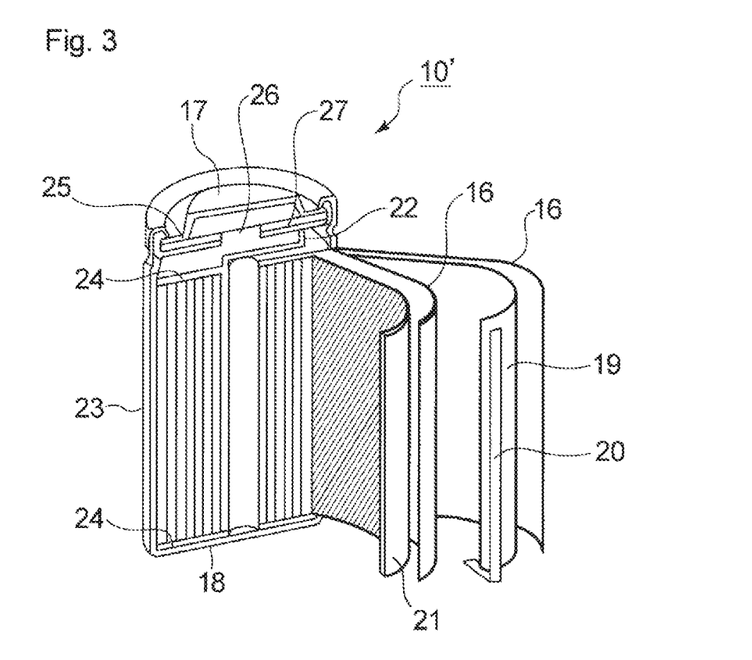
FIG. 3 is a perspective view showing the internal structure of the cylindrical non-aqueous electrolyte secondary battery of the present invention in cross section.

In a cylindrical non-aqueous electrolyte secondary battery 10' shown in FIGS. 2 and 3, 11 denotes a negative electrode, 12 denotes a negative electrode current collector, 13 denotes a positive electrode, 14 denotes a positive electrode current collector, 15 denotes a non-aqueous electrolyte, 16 denotes a separator, 17 denotes a positive electrode terminal, 18 denotes a negative electrode terminal, 19 denotes a negative electrode plate, 20 denotes a negative electrode lead, 21 denotes a positive electrode plate, 22 denotes a positive electrode lead, 23 denotes a case, 24 denotes an insulating plate, 25 denotes a gasket, 26 denotes a safety valve, and 27 denotes a PTC element.

As an outer casing member, a laminate film or a metal container can be used. The thickness of the outer casing member is normally 0.5 mm or less, and preferably 0.3 mm or less. The outer casing member may be flat (thin), rectangular, cylindrical, coin-shaped, button-shaped, or the like.

As the laminate film, a multilayer film that includes a metal layer between resin films may be used. As the metal layer, in order to reduce weight, it is preferable to use an aluminum foil or an aluminum alloy foil. The resin films may be made of a polymer material such as, for example, polypropylene, polyethylene, nylon, or polyethylene terephthalate. The laminate film can be formed into the shape of the outer casing member by being sealed through thermal fusing.

The metal container can be formed using, for example, stainless steel, aluminum, an aluminum alloy, or the like. The aluminum alloy is preferably an alloy that contains an element such as magnesium, zinc, or silicon. In the case where aluminum or an aluminum alloy is used, the amount of transition metal such as iron, copper, nickel, or chromium is set to 1% or less, as a result of which, long-term reliability and heat dissipation under a high temperature environment can be dramatically improved.

EXAMPLES

Hereinafter, the present invention will be described in further detail by way of examples and comparative examples. However, the present invention is not limited to the examples and the like given below. Unless otherwise stated, the terms "part" and "%" used in the examples mean "part by mass" and "% by mass", respectively.

Production Example 1

100 parts by mass of acrylonitrile, 500 parts by mass of deionized water, 0.6 parts by mass of sodium persulfate, 0.9 parts by mass of sodium hydrogen sulfite, and 0.000012 parts by mass of ferrous sulfate were fed into a glass reaction vessel equipped with a stirrer, a thermometer, a condenser, and a nitrogen gas inlet tube, and the pH was adjusted to 3 using sulfuric acid. After nitrogen purge, the temperature was increased to 60° C., and stirring was continued at 60° C. for 4 hours. A precipitate of the generated polyacrylonitrile was placed into a volume of water with a mass that was 20 times greater than the mass of the precipitate, and stirring was performed at 50° C. for 1 hour, followed by filtration and drying. The resulting dry polyacrylonitrile was pulverized using a mortar, and large particles were removed using a sieve having an opening diameter of 30 μm. Thus, a polyacrylonitrile A1 was obtained.

Production Example 2

A polyacrylonitrile A2 was obtained by performing a similar operation to that of Production Example 1, except that sodium persulfate of Production Example 1 was changed to potassium persulfate.

Production Example 3

A polyacrylonitrile A3 was obtained by performing a similar operation to that of Production Example 1, except that sodium persulfate and sodium hydrogen sulfite of Production Example 1 were changed to potassium persulfate and potassium hydrogen sulfite, respectively.

Production Example 4

A polyacrylonitrile A4 was obtained by performing a similar operation to that of Production Example 1, except that sodium persulfate of Production Example 1 was changed to ammonium persulfate.

Production Example 5

A polyacrylonitrile A5 was obtained by performing a similar operation to that of Production Example 1, except that sodium hydrogen sulfite of Production Example 1 was changed to ammonium hydrogen sulfite.

Production Example 6

100 parts by mass of acrylonitrile, 371 parts by mass of dimethyl sulfoxide, and 0.4 parts by mass of azobisisobutyronitrile were fed into a glass reaction vessel equipped with a stirrer, a thermometer, a condenser, and a nitrogen gas inlet tube. After nitrogen purge, the materials were polymerized through heating at 65° C. for 5 hours and at 75° C. for 7 hours. Then, unreacted acrylonitrile was removed by reducing the pressure, and 0.85 parts by mass of sodium stearate (available from Toei Chemical Industry Co., Ltd., product name: NA-ST) and 0.014 parts by mass of iron naphthenate (available from Toei Chemical Industry Co., Ltd., product name: iron naphthenate 5%) were added to obtain a dimethyl sulfoxide solution of polyacrylonitrile. This solution was extruded into water through a nozzle with a diameter of 0.08 mm. The obtained fiber-shaped polyacrylonitrile was cut to a length of about 5 mm and then placed into a volume of water with a mass that was 20 times greater than the mass of the polyacrylonitrile. Then, stirring was performed at 90° C. for 1 hour, followed by filtration and drying. Thus, a polyacrylonitrile A6 was obtained.

Production Example 7

A polyacrylonitrile A7 was obtained by performing a similar operation to that of Production Example 6, except that iron naphthenate was not added.

Production Example 8

A polyacrylonitrile A8 was obtained by performing a similar operation to that of Production Example 1, except that the amount of ferrous sulfate used in Production Example 1 was changed from 0.000012 parts by mass to 0.000003 parts by mass.

Production Example 9

A polyacrylonitrile A9 was obtained by performing a similar operation to that of Production Example 1, except that sodium persulfate and sodium hydrogen sulfite of Production Example 1 were changed to ammonium persulfate and ammonium hydrogen sulfite, respectively.

Production Example 10

A polyacrylonitrile A10 was obtained by performing a similar operation to that of Production Example 6, except that sodium stearate and iron naphthenate were not added.

Production Example 11

A polyacrylonitrile A11 was obtained by performing a similar operation to that of Production Example 6, except that the amount of sodium stearate was changed from 0.45 parts by mass to 0.05 parts by mass.

Production Example 12

100 parts by mass of acrylonitrile, 500 parts by mass of deionized water, 3.4 parts by mass of sodium persulfate, and 1.3 parts by mass of sodium hydrogen sulfite were fed into a glass reaction vessel equipped with a stirrer, a thermometer, a condenser, and a nitrogen gas inlet tube, and the pH was adjusted to 3 using sulfuric acid. After nitrogen purge, the temperature was increased to 40° C., and stirring was continued at 40° C. for 5 hours. A precipitate of the generated polyacrylonitrile was placed into a volume of water with a mass that was 20 times greater than the mass of the precipitate, and stirring was performed at 50° C. for 1 hour, followed by filtration and drying. The resulting dry polyacrylonitrile was pulverized using a mortar, and large particles were removed using a sieve having an opening diameter of 30 μm. Thus, a polyacrylonitrile A12 was obtained.

Production Example 13

600 parts by mass of deionized water, 100 parts by mass of acrylonitrile, 6 parts by mass of an anionic surfactant, dioctyl sodium sulfosuccinate (available from ADEKA Corporation, product name: Adekacol EC-4500), and 0.3 parts by mass of sodium persulfate were fed into a glass reaction vessel equipped with a stirrer, a thermometer, a condenser, a drip tube, and a nitrogen gas inlet tube, and the pH was adjusted to 3 using sulfuric acid. After nitrogen purge, the temperature was increased to 55° C., and 200 parts by mass of acrylonitrile was dripped for 90 minutes. After dripping was finished, the temperature was increased to 80° C., and stirring was continued for 5 hours. A precipitate of the generated polyacrylonitrile was placed into a volume of water with a mass that was 20 times the mass of the precipitate, and stirring was performed at 50° C. for 1 hour, followed by filtration and drying. The resulting dry polyacrylonitrile was pulverized using a mortar, and large particles were removed using a sieve having an opening diameter of 30 μm. Thus, a polyacrylonitrile A13 was obtained.

Table 1 shows the results of analysis of the total amount of sodium and potassium and the amount of iron in the polyacrylonitriles A1 to A13. The amounts of the respective metals were determined using an ICP emission spectrometer with use of a solution prepared by dissolving a dry-ashed specimen in sulfuric acid and hydrofluoric acid.

TABLE 1

|  | Na, K (ppm) | Fe (ppm) |
| --- | --- | --- |
| A1 | 770 | 6.7 |
| A2 | 893 | 10.1 |
| A3 | 853 | 8.4 |
| A4 | 481 | 7.2 |
| A5 | 396 | 8.0 |
| A6 | 865 | 8.1 |
| A7 | 878 | 0.5 or less |
| A8 | 780 | 1.5 |
| A9 | 11 | 7.8 |
| A10 | 3 | 0.5 or less |
| A11 | 83 | 7.9 |
| A12 | 1820 | 0.5 or less |
| A13 | 1670 | 0.5 or less |

Example 1

10 parts by mass of the polyacrylonitrile A1 and 30 parts by mass of sulfur powder (available from Sigma-Aldrich Co., average particle size: 200 μm) were mixed using a mortar. As in the examples disclosed in JP 2013-054957A, the mixture was housed in a bottomed cylindrical glass tube, and thereafter, the lower portion of the glass tube was placed in a crucible electric furnace and heated at 400° C. for 1 hour while removing generated hydrogen sulfide under a flow of nitrogen gas. After cooling, the resulting product was placed in a glass tube oven, and heated at 250° C. for 3 hours while evacuating the glass tube oven so as to remove elemental sulfur. The obtained sulfur-modified product was pulverized using a ball mill and then classified using a sieve. Thus, a sulfur-modified polyacrylonitrile PANS 1 with an average particle size of 10 μm was obtained.

PANS 2 to PANS 13 were obtained by performing similar operations to that of Example 1, except that the polyacrylonitriles A2 to A13 were used instead of the polyacrylonitrile A1.

Table 2 shows the results of analysis of the total amount of sodium and potassium, the amount of iron, and the amount of sulfur in PANS 1 to PANS 12, as well as the average particle size thereof. Sodium, potassium, and iron were analyzed using methods similar to the method for analyzing polyacrylonitrile, and the amount of sulfur was calculated from the result of analysis performed using a CHN analyzer capable of analyzing sulfur and oxygen. PANS 1 to PANS 8 were sulfur-modified polyacrylonitriles of the present invention, and PANS 9 to PANS 13 were sulfur-modified polyacrylonitriles of comparative examples.

TABLE 2

| | Na, K (ppm) | Fe (ppm) | S (%) | Average particle size (μm) |
|---|---|---|---|---|
| PANS 1 | 522 | 4.5 | 36 | 10 |
| PANS 2 | 606 | 6.8 | 36 | 9 |
| PANS 3 | 580 | 5.6 | 35 | 7 |
| PANS 4 | 324 | 4.9 | 37 | 8 |
| PANS 5 | 263 | 5.4 | 35 | 11 |
| PANS 6 | 583 | 5.6 | 37 | 10 |
| PANS 7 | 591 | 0.5 or less | 35 | 9 |
| PANS 8 | 550 | 1.1 | 37 | 8 |
| PANS 9 | 8 | 5.4 | 36 | 8 |
| PANS 10 | 2 | 0.5 or less | 35 | 10 |
| PANS 11 | 56 | 5.4 | 37 | 11 |
| PANS 12 | 1210 | 0.5 or less | 36 | 9 |
| PANS 13 | 1130 | 0.5 or less | 38 | 10 |

Production of Electrodes

Electrodes of Examples 2 to 9 and Comparative Examples 1 to 5 were produced in the following manner using the sulfur-modified polyacrylonitriles PANS 1 to PANS 13.

A slurry was prepared by mixing, using a rotation/revolution mixer, 92.0 parts by mass of sulfur-modified polyacrylonitrile as an electrode active material, 3.5 parts by mass of acetylene black (available from Denki Kagaku Kogyo K.K.) and 1.5 parts by mass of carbon nanotubes (available from Showa Denko K.K., product name: VGCF) as conductive aids, 1.5 parts by mass of styrene-butadiene rubber (aqueous dispersion, available from Zeon Corporation) and 1.5 parts by mass of carboxymethyl cellulose (available from Daicel FineChem Ltd.) as binders, and 120 parts by mass of water as a solvent. The slurry composition was applied to a current collector made of a stainless steel foil (thickness: 20 μm) using a doctor blade method, and dried at 90° C. for 3 hours. After that, the electrode was cut into a piece with a predetermined size, and the cut piece was vacuum-dried at 120° C. for 2 hours. Thus, a disc-shaped electrode was produced.

Production of Positive Electrode 1

A slurry was prepared by mixing, using a rotation/revolution mixer, 90.0 parts by mass of $Li(Ni_{1/3}Co_{1/3}Mn_{1/3})O_2$ (available from Nihon Kagaku Sangyo Co., Ltd., product name: NCM 111) as a positive electrode active material, 5.0 parts by mass of acetylene black (available from Denki Kagaku Kogyo K.K.) as a conductive aid, 5.0 parts by mass of polyvinylidene fluoride (available from Kureha Corporation) as a binder, and 100 parts by mass of N-methyl pyrrolidone as a solvent. The slurry composition was applied to a current collector made of an aluminum foil (thickness: 20 μm) using a doctor blade method, and dried at 90° C. for 3 hours. After that, the electrode was cut into a piece with a predetermined size, and the cut piece was vacuum-dried at 120° C. for 2 hours. Thus, a disc-shaped positive electrode 1 was produced.

Production of Negative Electrode 1

A disc-shaped negative electrode 1 was produced by cutting a lithium metal with a thickness of 500 μm into a piece with a predetermined size.

Preparation of Non-Aqueous Electrolyte

An electrolyte solution was prepared by dissolving $LiPF_6$ in a mixed solvent containing 50 vol % of ethylene carbonate and 50 vol % of diethyl carbonate so that the concentration of $LiPF_6$ was 1.0 mol/L.

Battery Assembling

The electrode of each of Examples 2 to 9 and Comparative Examples 1 to 5 was used as a positive electrode, and the negative electrode 1 was used as a negative electrode. The electrodes were held in a case with a glass filter, which served as a separator, sandwiched therebetween. After that, the previously prepared non-aqueous electrolyte was injected into the case, and the case was hermetically sealed. In this manner, non-aqueous electrolyte secondary batteries (coin-type with φ20 mm and a thickness of 3.2 mm) of Examples 10 to 17 and Comparative Examples 6 to 10 were produced.

On the other hand, the electrode of each of Examples 2 to 9 and Comparative Examples 1 to 5 was used as a negative electrode, and the positive electrode 1 was used as a negative electrode. The electrodes were held in a case with a glass filter, which served as a separator, sandwiched therebetween. After that, the previously prepared non-aqueous electrolyte was injected into the case, and the case was hermetically sealed. In this manner, non-aqueous electrolyte secondary batteries (coin-type with φ20 mm and a thickness of 3.2 mm) of Examples 18 to 25 and Comparative Examples 11 to 15 were produced.

Charge Discharge Test Method

Each non-aqueous electrolyte secondary battery was placed in a constant temperature bath set at 25° C., and charged and discharged a total of ten cycles as follows: under conditions of an end-of-charge voltage of 3.0 V and an end-of-discharge voltage of 1.0 V, five charge discharge cycles were performed at a charging rate of 0.1 C and a discharging rate of 0.1 C, and then five charge discharge cycles were performed at a charging rate of 1 C and a discharging rate of 1 C. The charge capacity and the discharge capacity (unit: mAh/g) were measured in each cycle.

The ratio of the discharge capacity to the charge capacity in the first cycle was used as the initial efficiency (%), and the proportion of the discharge capacity in the tenth cycle to the discharge capacity in the fifth cycle was used as the capacity maintenance rate (%). Tables 3 and 4 show the results.

TABLE 3

| | Electrode active material | Initial efficiency (%) | Capacity maintenance rate (%) |
|---|---|---|---|
| Ex. 10 | PANS 1 | 78.3 | 68 |
| Ex. 11 | PANS 2 | 78.4 | 64 |
| Ex. 12 | PANS 3 | 78.0 | 66 |
| Ex. 13 | PANS 4 | 76.4 | 63 |
| Ex. 14 | PANS 5 | 76.9 | 63 |
| Ex. 15 | PANS 6 | 78.0 | 66 |
| Ex. 16 | PANS 7 | 77.3 | 63 |
| Ex. 17 | PANS 8 | 77.6 | 65 |
| Com. Ex. 6 | PANS 9 | 74.6 | 56 |
| Com. Ex. 7 | PANS 10 | 74.8 | 55 |
| Com. Ex. 8 | PANS 11 | 74.9 | 59 |
| Com. Ex. 9 | PANS 12 | 75.0 | 58 |
| Com. Ex. 10 | PANS 13 | 75.1 | 56 |

TABLE 4

| | Electrode active material | Initial efficiency (%) | Capacity maintenance rate (%) |
|---|---|---|---|
| Ex. 18 | PANS 1 | 78.4 | 67 |
| Ex. 19 | PANS 2 | 78.6 | 64 |
| Ex. 20 | PANS 3 | 78.1 | 65 |
| Ex. 21 | PANS 4 | 76.6 | 61 |
| Ex. 22 | PANS 5 | 76.9 | 62 |
| Ex. 23 | PANS 6 | 78.2 | 64 |
| Ex. 24 | PANS 7 | 77.6 | 62 |
| Ex. 25 | PANS 8 | 77.7 | 64 |
| Com. Ex. 11 | PANS 9 | 74.7 | 55 |
| Com. Ex. 12 | PANS 10 | 74.8 | 53 |
| Com. Ex. 13 | PANS 11 | 75.0 | 57 |
| Com. Ex. 14 | PANS 12 | 75.3 | 57 |
| Com. Ex. 15 | PANS 13 | 75.1 | 55 |

INDUSTRIAL APPLICABILITY

According to the present invention, it is possible to provide an electrode active material that has a large charge discharge capacity, a high initial efficiency, as well as excellent cycle characteristics and rate characteristics and is favorably used in a non-aqueous electrolyte secondary battery.

LIST OF REFERENCE NUMERALS

1 Positive electrode
1a Positive electrode current collector
2 Negative electrode
2a Negative electrode current collector
3 Electrolyte solution
4 Positive electrode case
5 Negative electrode case
6 Gasket
7 Separator
10 Coin-type non-aqueous electrolyte secondary battery
10' Cylindrical non-aqueous electrolyte secondary battery
11 Negative electrode
12 Negative electrode current collector
13 Positive electrode
14 Positive electrode current collector
15 Electrolytic solution
16 Separator
17 Positive electrode terminal
18 Negative electrode terminal
19 Negative electrode plate
20 Negative electrode lead
21 Positive electrode plate
22 Positive electrode lead
23 Case
24 Insulating plate
25 Gasket
26 Safety valve
27 PTC element

The invention claimed is:

1. An organo sulfur-based electrode active material comprising sodium and potassium in a total amount of 100 ppm by mass to 1000 ppm by mass.

2. The organo sulfur-based electrode active material according to claim 1, further comprising iron in an amount of 1 ppm by mass to 20 ppm by mass.

3. The organo sulfur-based electrode active material according to claim 1, wherein the amount of sulfur in the organo sulfur-based electrode active material is 25 mass % to 60 mass %.

4. The organo sulfur-based electrode active material according to claim 1, wherein the organo sulfur-based electrode active material is a sulfur-modified polyacrylonitrile.

5. An electrode for a secondary battery, comprising the organo sulfur-based electrode active material according to claim 1 as an electrode active material.

6. A non-aqueous electrolyte secondary battery, comprising the electrode for a secondary battery according to claim 5 as a positive electrode.

7. A non-aqueous electrolyte secondary battery, comprising the electrode for a secondary battery according to claim 5 as a negative electrode.

8. A method for producing a sulfur-modified polyacrylonitrile containing sodium and potassium in a total amount of 100 ppm by mass to 1000 ppm by mass, the method comprising:
    a step of heating a mixture of a polyacrylonitrile containing sodium and potassium in a total amount of 126 ppm by mass to 2360 ppm by mass and elemental sulfur in a non-oxidizing atmosphere.

9. The organo sulfur-based electrode active material according to claim 2, wherein the amount of sulfur in the organo sulfur-based electrode active material is 25 mass % to 60 mass %.

10. The organo sulfur-based electrode active material according to claim 2, wherein the organo sulfur-based electrode active material is a sulfur-modified polyacrylonitrile.

11. The organo sulfur-based electrode active material according to claim 3, wherein the organo sulfur-based electrode active material is a sulfur-modified polyacrylonitrile.

12. An electrode for a secondary battery, comprising the organo sulfur-based electrode active material according to claim 2 as an electrode active material.

13. An electrode for a secondary battery, comprising the organo sulfur-based electrode active material according to claim 3 as an electrode active material.

14. An electrode for a secondary battery, comprising the organo sulfur-based electrode active material according to claim 4 as an electrode active material.

15. The organo sulfur-based electrode active material according to claim 9, wherein the organo sulfur-based electrode active material is a sulfur-modified polyacrylonitrile.

16. An electrode for a secondary battery, comprising the organo sulfur-based electrode active material according to claim 9 as an electrode active material.

17. An electrode for a secondary battery, comprising the organo sulfur-based electrode active material according to claim 10 as an electrode active material.

18. An electrode for a secondary battery, comprising the organo sulfur-based electrode active material according to claim 11 as an electrode active material.

19. An electrode for a secondary battery, comprising the organo sulfur-based electrode active material according to claim 15 as an electrode active material.

* * * * *